Sept. 20, 1966   C. A. JOSLIN   3,273,694
PORTABLE CONVEYOR
Filed Sept. 21, 1964   2 Sheets-Sheet 1
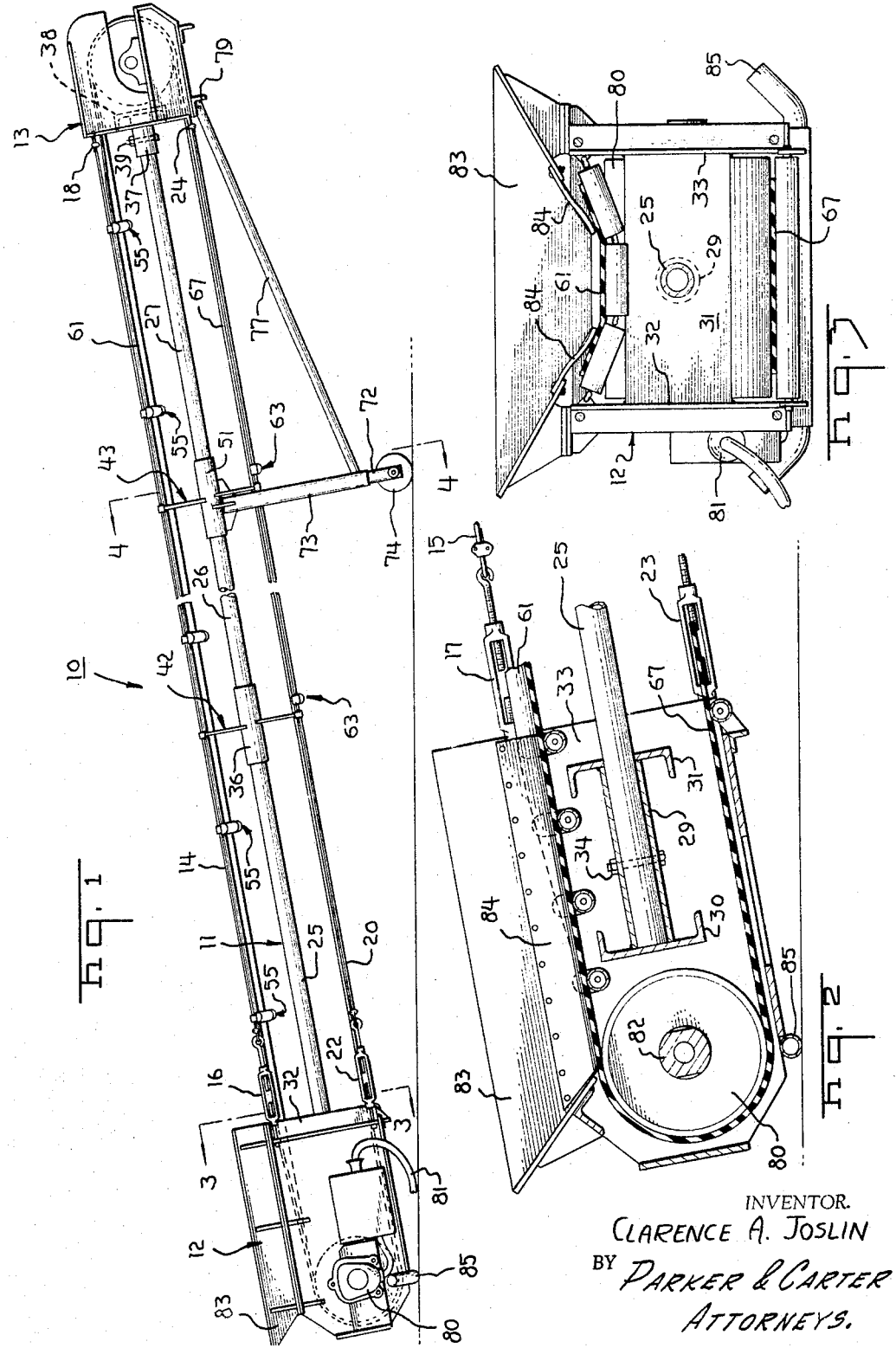
INVENTOR.
CLARENCE A. JOSLIN
BY *Parker & Carter*
ATTORNEYS.

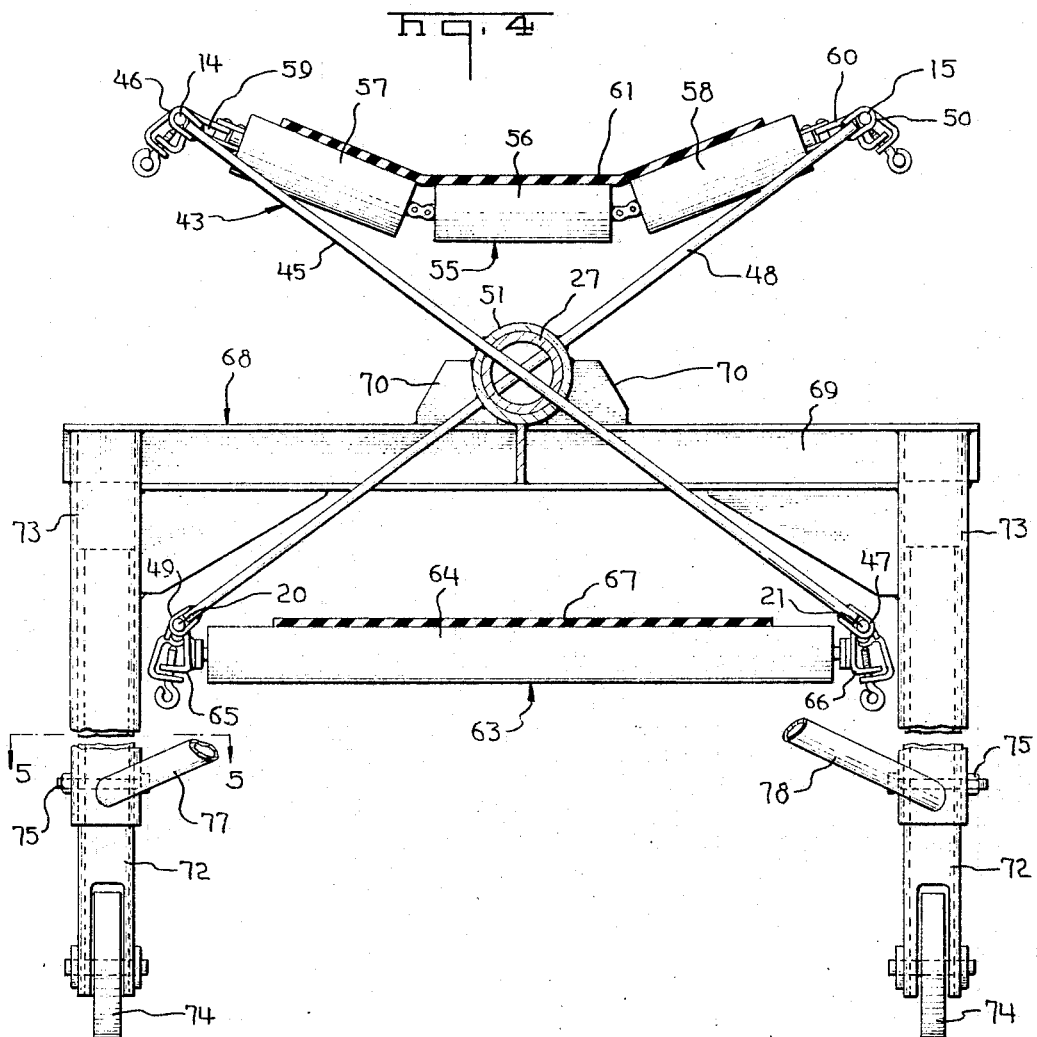

United States Patent Office 3,273,694
Patented Sept. 20, 1966

3,273,694
PORTABLE CONVEYOR
Clarence A. Joslin, Chicago, Ill., assignor to Goodman Manufacturing Company, Chicago, Ill., a corporation of Illinois
Filed Sept. 21, 1964, Ser. No. 397,911
9 Claims. (Cl. 198—129)

This invention relates to the conveying art and specifically to a portable conveyor especially useful for transferring material relatively short distances between vertically offset locations.

Flexible strand side frame conveyors of the type illustrated generally in the Craggs et al. Patent 2,773,257 have come into widespread use. This type of conveyor has the very great advantage of high impact absorption, due in large measure to the flexibility of the wire rope side frames, and a high load carrying capacity, due primarily to the combined effects of the resilient wire rope side frames and the flexible troughing idler assemblies which enable the carrying belt to curl around the load and thereby assume an ideal troughing contour.

It has been found, however, that the wire rope side frames must be supported at reasonable distances to thereby prevent undue catenary droop or sag of the wire ropes. Consequently, use of a wire rope side frame of the precise embodiment illustrated in the Craggs et al. patent is not readily applicable to conveying environments in which materials must be transferred, perhaps only temporarily, relatively short distances from one elevation to another.

Rigid type side frame conveyors have been known to the art for many years and this type of conveyor has been applied to applications in which material must be transferred relatively short distances from one elevation to another. The rigidity of the conveyor also makes it easy for the manufacturer to incorporate the feature of portability into the conveyor. This type of conveyor, however, has the very great disadvantage of relatively low impact absorption and relatively low load carrying capacity.

Accordingly, it is a primary object of this invention to provide a portable, flexible belt conveyor especially adapted for transferring materials from one elevation to another in which at least the conveying reach of the belt is carried by flexible strand side frame means.

Another object is to provide a portable conveyor for transferring materials from one elevation to another which incorporates the easy portability of the rigid frame type conveyor and the high load carrying and high impact absorbing qualities of the flexible side frame type conveyor, whereby the outstanding features of each conveyor are used to the best advantage.

Yet another object of this invention is to provide a portable, flexible belt conveyor of the type described immediately above in which the length of the conveyor can be easily extended.

Another object is to provide a portable, flexible belt conveyor which includes a generally centrally located substantially rigid core structure from which are suspended flexible strand side frame means for supporting the conveying reach of a belt conveyor.

Yet a further object of the invention is to provide a portable conveyor especially adapted for transferring materials from one elevation to another having a rigid frame structure extending from end to end and flexible strand means for providing a resilient support to a load, the rigid frame and flexible strand means acting conjointly to furnish the impact absorption of a wire rope conveyor and the ruggedness of a rigid frame conveyor while being only a fraction of the weight of a rigid conveyor of similar length and nominal capacity.

Other objects and intended advantages of the invention will become apparent upon reading the following description of the invention.

The invention is illustrated more or less diagrammatically in the accompanying drawings wherein:

FIGURE 1 is a side view of the conveyor of the invention;

FIGURE 2 is a sectional view, to an enlarged scale, taken longitudinally along through the tail end of the conveyor of FIGURE 1;

FIGURE 3 is a section, to an enlarged scale, taken substantially along the line 3—3 of FIGURE 1;

FIGURE 4 is a section, to an enlarged scale, taken substantially along the line 4—4 of FIGURE 1;

FIGURE 5 is a detail sectional view taken substantially along the line 5—5 of FIGURE 4; and FIGURE 6 is a view, to an enlarged scale, with portions broken away for clarity of the structural connection between the core structure and the brace members.

Like reference numerals will be used to refer to like parts throughout the following description of the drawings.

The portable conveyor of this invention is indicated generally at 10 in FIGURE 1. The conveyor includes a core structure, indicated generally at 11, which terminates at one end at a tail section 12 and at the other end at a head section 13. A pair of flexible strand side frames, in this instance wire ropes, are indicated at 14 and 15. The ropes are normally parallel to one another and form, in effect, a pair of runs from which the load is eventually supported. The tail ends of the ropes are connected to the tail structure 12 by turn buckles 16 and 17, see FIGURE 2. The head ends of the ropes may merely be tied off to the head section 13, as at 18. The tension in the ropes may be varied by tightening or slacking off the turn buckles 16 and 17.

A second pair of wire ropes are indicated at 20 and 21. The tail ends of these ropes are connected to tail section 12 by a pair of turn buckles 22, 23. The head ends may merely be tied off at the head section, as at 24. This second pair of wire ropes is located beneath the first pair, each rope being in generally vertical alignment with one of the ropes of the upper pair.

The core structure 11 consists essentially of a plurality of tubular members 25, 26 and 27 which are preferably of the same nominal outside diameter. The lowermost or tail end of member 25 is received in a sleeve 29 welded to a pair of brackets 30, 31 which in turn are welded or otherwise suitably secured to the side frames 32, 33 of tail section 12. The tubular core member is locked to the sleeve 29 by bolt 34 which passes through aligned apertures in the sleeve and core member. Abutting ends of consecutive tubular core members, such as members 25 and 26, are connected by a sleeve 36 having an internal diameter sufficiently large to slidably receive the core members.

The upper or head end of head core member 27 is received in a sleeve 37 carried by a cross bar 38 which in turn is welded to the sides of head section 13. Again, any suitable connecting means, such as bolt 39, locks the core member 27 to the anchoring sleeve 37.

A plurality of pairs of bodily resilient structural supporting braces are indicated generally at 42, 43. The pair of braces 43, shown best in FIGURE 4, consists of a first radial brace 45 which carries, at each end, a hook or loop 46 and 47. Wire rope 14 loosely passes through loop 46 and wire rope 21 loosely passes through loop 47. The other brake 48 carries similar loops 49 and 50 through which wire ropes 20 and 15 pass, respectively.

Cross braces 45 and 48 are welded or otherwise secured to a joint sleeve 36, shown best in FIGURE 3.

The sleeve and brace assembly provides torsional stability to the structure by keying core members 25 and 26 to one another, and preventing their rotation with respect to one another. Each of core members 25 and 26 has a pair of diametrically opposed notches cut in each end. The notches are of a width at least equal to the diameter of the cross braces, and of a depth slightly greater than the diameter of the cross braces. Preferably the cross braces are slidably, but snugly, received in the seats to reduce the play or possible torsional looseness to an absolute minimum. When assembled, the opposed ends of core members 25 and 26 are in abutting engagement. The core members are therefore prevented from rotating with respect to one another by the cross braces which in turn are held against rotation with respect to each other by the sleeve 36.

Since the core members are not secured to the cross braces, as best seen in FIGURES 4 and 6, increasing or decreasing the length of the core structure is a simple matter of adding or removing core members.

Troughing idler assemblies are indicated generally at 55 in FIGURES 1 and 4. Each troughing idler assembly may for example consist of a center roller 56 flanked by a pair of wing rollers 57 and 58, the rollers being articulately connected by bicycle chain links which enable them to flex in a generally vertical plane. Suitable connecting means, such as hooks 59, 60 of the type illustrated in the Craggs et al. patent, secure each troughing idler assembly to the wire rope side frames. The troughing idler assemblies form a bed for the conveying reach 61 of a flexible conveyor belt.

A plurality of return roller assemblies are indicated generally at 63. The return roller assemblies consist essentially of a single elongated roller 64 which is connected to wire ropes 20 and 21 by any suitable connecting means 65 and 66. It will be understood, however, that the exact construction of the return roller assemblies and their mode of connection to the wire ropes is not an essential part of the invention. The return rollers support the return reach 67 of the flexible conveyor belt.

Means for raising and lowering the head section 13 with respect to the tail section is best shown in FIGURES 1 and 4. The elevating means consists essentially of an inverted V-shaped frame indicated generally at 68. The frame includes a cross member 69 to which a pair of core structure supporting plates 70 are secured. Each downwardly extending leg of the frame consists of a pair of telescoping members 72, 73, the outer member 73 being welded at its upper end to the cross member 69. The inner telescoping member 72 carries a wheel 74 at its lower end. The length of each leg may be extended or contracted by a bolt 75 which passes through aligned apertures in the telescoping members.

A pair of reinforcing or tie rod members 77, 78 extend, respectively, from the outer member 73 up to a cross member 79 carried by the head section 13.

Tail section 12 carries a motorized pulley 80 which is connected through a junction box and electrical means 81 to any suitable convenient source of power. The pulley is supported by a shaft 82 carried by suitable pillow blocks, not shown, on either side of the tail section. A hopper is indicated at 83, the lower periphery of the hopper carrying a rubber apron 84 which directs material dumped into the hopper toward the center of the conveying reach of the belt.

The tail section rests on a bed pipe 85, shown best in FIGURE 3, which enables the entire conveyor to be easily skidded along the ground.

Four individual runs or lengths of rope have been shown. It should be understood that it is within the scope of the invention to wind a single rope back and forth so that the application of tension to one end of the rope will place the entire rope under tension. In the illustrated embodiment, each rope is placed under tension by tightening the turn buckle associated with the rope.

The use and operation of the invention is as follows:

The conveyor may be easily fabricated to any desired length by merely connecting abutting sections 25, 27 and 26 together by sleeve connectors 36. Once the proper number of core members have been selected, the cross brace members 45, 48 and connecting sleeves 36, 51 are assembled to the core members. The core structure is connected to the tail and head sections by sleeves 29 and 37 and the entire assembly held in assembled relationship by applying tension to the wire rope runs.

The conveyor may be skidded from place to place by applying a pulling force to head section 13. Skid member 85 is circular in contour, as best shown in FIGURE 2, and will pass over rather small irregularities of the terrain. Alternately, the tail section of the conveyor may be hooked to a tractor or implement and the conveyor towed with wheels 74 and the U-shaped elevating structure 68 supporting the head end of the conveyor. Once the conveyor is spotted, the proper elevation is obtained by adjusting the inner section 72 with respect to the outer section 73 of the legs of the U-shaped supporting member 68. Ropes 14, 15, 20 and 21 may be slacked off during transport. They are then merely tightened by rotating turn buckles 16, 17, 22 and 23 prior to starting the conveyor. When the turn buckles are tightened, the ropes tend to compress the core structure 11 and thereby stabilize it.

The material to be conveyed is given a cushioned ride by virtue of the wire ropes 14, 15 from which the troughing idler assemblies are suspended. Brace members 45, 48 are bodily resilient and will give or yield under shock loads. A heavy load passing over roller 56 of FIGURE 4 will for example tend to pull wire ropes 14 and 15 toward one another and the brace members will be bowed slightly toward one another.

Although several embodiments of the invention have been disclosed, it will at once appear to those skilled in the art that various changes may be made without departing from the essential spirit of the invention. Accordingly, it is the intention that the scope of the invention be limited not by the scope of the foregoing description but solely by the scope of the hereinafter appended claims when interpreted in light of the disclosures of the pertinent prior art.

I claim:
1. In a conveying structure,
   elongated compression tube means, said means having a terminal at each end,
   a pulley associated with each terminal,
   an endless conveyor belt reeved about the two pulleys,
   upper and lower flexible strand means disposed at levels respectively above and below the compression tube means and substantially parallel with it
   roller means carried by the flexible strand means and effectively supporting the conveyor belt along substantially the entire length of the compression tube means,
   the strand means being connected respectively between the terminals, and
   means for stretching the strand means to simultaneously apply compression in the compression tube means and tension in the strand means to furnish support for the belt.

2. The structure of claim 1 further characterized in that the upper and lower flexible strand means each comprise a pair of strands.

3. The structure of claim 2 further including intermediate cross-braces which provide mutual support between the elongated compression tube means and the four flexible strands.

4. The structure of claim 3 further characterized in that the elongated compression tube means includes a plurality of short lengths of pipe compressibly socketed in sleeve connector portions of the cross-brace members.

5. The structure of claim 3 further characterized in that the cross-brace members are received in openings formed in the abutting ends of a pair of abutting pipes, one cross-brace member to each pipe, to thereby provide torsional stability and maintain end-to-end abutment of the pipes whereby the maximum compressive strength of the pipes is utilized.

6. The structure of claim 5 further including
a plurality of sleeve connectors,
one for each pair of abutting pipe ends,
each sleeve connector extending along each pipe a substantial distance on either side of the abutting ends,
each sleeve having a plurality of apertures therein through which the cross-braces pass.

7. In a conveying structure,
elongated compression tube means, said means having a terminal at each end,
elevating means engaging the compression tube means nearer one end than the other,
a pulley associated with each terminal,
an endless conveyor belt reeved about the two pulleys,
a belt motor and drive means located at the other end,
upper and lower flexible strand means disposed at levels respectively above and below the compression tube means and substantially parallel with it,
roller means carried by the flexible strand means and effectively supporting the conveyor belt along substantially the length of the compression tube means,
the strand means being connected respectively between the terminals, and
means for stretching the strand means to simultaneously apply compression in the compression tube means and tension in the strand means to furnish support for the belt.

8. A conveying structure, said conveying structure including, in combination
flexible strand means, said flexible strand means including
upper side frame means and lower strand means,
a core structure extending generally from end to end of the conveying structure, said core structure being disposed between the upper side frame means and the lower strand means,
troughing idler assemblies supported from the upper side frame means,
structure connecting the core structure to the flexible strand means, and
means for applying tension to the flexible strand means, and thereby, through the connecting structure, to the core structure.

9. A light weight, portable conveyor for transferring material from one elevation to another, said conveyor including, in combination,
a generally tubular core member extending from one end of the conveyor to the other,
two pairs of wire ropes extending from one end of the conveyor to the other,
each pair of wire ropes being generally parallel one to the other,
bodily resilient supporting braces suspending the pairs of wire rope from the tubular core structure, said braces maintaining the ropes generally parallel one to the other from one end of the conveyor to the other,
and a vertically adjustable elevating mechanism secured to the core structure nearer one end of the conveying structure than the other,
said elevating structure being effective to raise and lower the end of the conveying structure which it is nearest with respect to the remaining end of the conveying structure.

References Cited by the Examiner

UNITED STATES PATENTS

| | | | |
|---|---|---|---|
| 2,343,444 | 3/1944 | Coon | 198—233 |
| 2,822,913 | 2/1958 | Craggs | 198—139 |
| 2,907,448 | 10/1959 | Gleeson | 198—192 |
| 3,189,168 | 6/1965 | Coats | 198—233 X |

EVON C. BLUNK, *Primary Examiner.*

EDWARD A. SROKA, *Examiner.*